May 21, 1935.  R. L. TRIPLETT  2,001,945
AUDION TUBE TESTER
Original Filed Jan. 11, 1932
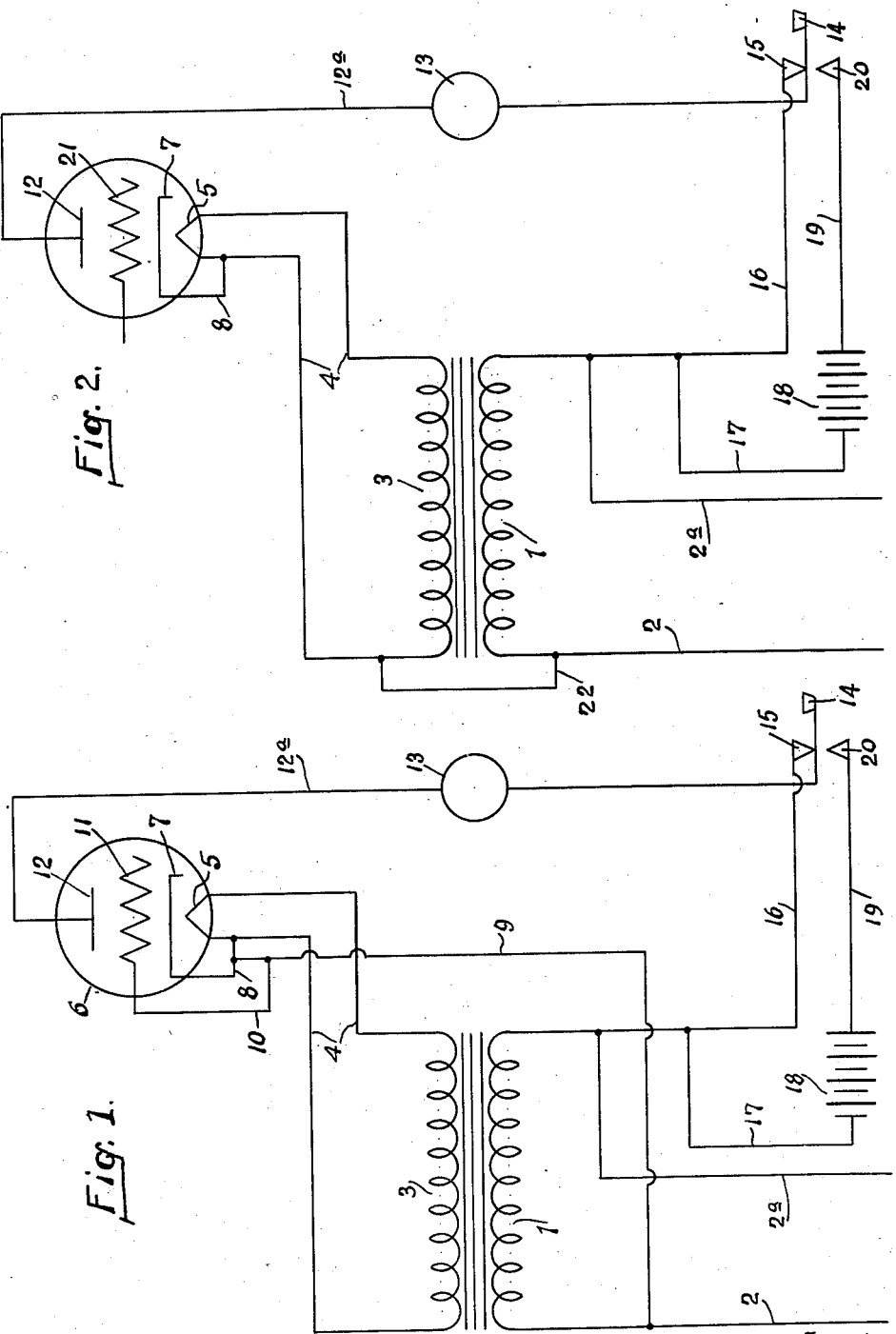
Inventor
RAY L. TRIPLETT,
By Toulmin & Toulmin
Attorneys Patented May 21, 1935

2,001,945

UNITED STATES PATENT OFFICE 2,001,945

AUDION TUBE TESTER

Ray L. Triplett, Bluffton, Ohio

Original application January 11, 1932, Serial No. 585,937. Divided and this application March 13, 1933, Serial No. 660,559

8 Claims. (Cl. 250—27)

This invention relates to a method of and apparatus for testing vacuum tubes, and particularly to methods and apparatus in which an alternating current source may be employed to energize all of the circuits of the tube.

Audion tubes are usually tested by applying different voltages to the grid and determining the mutual conductance of the tube by measuring the change in the plate current caused by the different grid voltages. In tubes of this kind the electron flow is increased or decreased within defined limits by change of voltages applied to the various elements. Electrons are attracted to the plate within a certain definite limit determined by the current through the filament and the bias voltages upon the grid. Hence, within certain limits, the conductance of the tube may be determined by varying the plate voltage, the initial voltages applied to the other tube elements remaining unchanged.

In audion tubes the electron flow may be increased or decreased within defined limits by different voltages applied to the various elements. The electrons are attracted to the plate within specified limits, as the plate voltage becomes more positive. Hence, within certain limits the conductance of a tube may be determined by varying only the plate voltage, while the initial voltages applied to the other tube elements remain unchanged. By measuring the conductance of the tube under different conditions of plate voltage the worth of a tube can be obtained.

It is my object to maintain the input into the tube or the grid conditions the same, and to change the applied potential of the output or plate circuit, and measuring the plate current with the two or more applied potentials and subtracting the difference to determine the value of the tube. In other words, by having a standard grid and filament condition and varying the plate condition I can determine the value of the tube.

This application is a division of my copending application, Ser. No. 585,937, filed January 11, 1932.

In the present drawing preferred embodiments of this invention are shown.

Figure 1 is a diagrammatic view of an alternating current tube tester in which a battery circuit may be connected into the plate circuit.

Figure 2 is a view similar to Figure 1 but showing a floating grid.

The numeral 1 is used to designate the primary of a transformer which is connected across a source of alternating current by two lines or wires 2 and 2a. The secondary of the transformer is indicated by the numeral 3, and has extending therefrom wires or conductors 4, leading to a filament 5 of a radiant tube 6. This tube has an intermediate grid member 7 connected to one of the conductors 4 by means of a conductor or wire 8, which is connected by means of a conductor or wire 9 to the wire 2 of the primary of the transformer.

A control grid 11 of the tube is connected by means of a line or conductor 10 to the conductor 9. The plate 12 of the tube has connected thereto a line 12a, which has in it a milliameter 13. On the end of the line or conductor 12a, remote from the plate 12, is a switch 14 which is normally in engagement with the contact point 15 on one end of a conductor 16 connected to the wire 2a of the primary of the transformer.

Extending from the conductor 16 is a conductor 17, which is connected to one side of a battery 18, which has connected to its other side a conductor 19. The conductor 19 has on its end, remote from the battery, a contact point 20 which is adapted to be engaged by the switch 14 when it is pressed down. The plate circuit normally consists of the conductors 16 and 12a, the plate 12, filament 5 and the conductor 9 connected across the two conductors of the primary coil of the transformer.

Under these conditions the full voltage of the primary circuit of the transformer passes through this circuit. The voltage of this circuit may have superimposed upon it the voltage of the battery 18. In order to superimpose upon the alternating current the current of the battery 18 the switch 14 is pressed down into engagement with the contact point 20, thereby causing an alternating voltage and a direct voltage to pass through the plate circuit. There may be, therefore, two different voltages applied to the plate circuit, while the filament voltage and the grid voltage are maintained at constant values. The differences in the currents through the plate circuit are measured by the milliameter 13. By means of these differences the quality and characteristic of the tube may be determined.

In Figure 2 there is a floating grid 21 and the conductor 9 is removed and its function accomplished by means of a conductor 22 connecting the primary of the transformer to the secondary of the transformer. In this form instead of the plate circuit including the conductor 9, it includes one of the wires or conductors 4 and the conductor 22. The application of the varying voltages to the plate circuit is effected in this form in the same manner that it is effected in the form shown in Figure 1, and variations in the current are registered by means of the milliameter 13.

It will be understood that I desire to comprehend within my invention such modifications as come within the scope of my claims and my invention.

Having thus fully described my invention, what I claim as new and desire to secure by Letters Patent, is:

1. In an apparatus for testing audion tubes, an audion tube, a circuit supplied with current, a transformer associated therewith having its primary therein, a plate circuit connected into one side of said circuit containing the primary of the transformer, a switch in the plate circuit, an additional source of potential, means for connecting it into said plate circuit by said switch, and a measuring instrument in said plate circuit whereby the differences in applied potential to the plate may be indicated on the measuring instrument to show the condition of the tube.

2. In an audion tube tester, a transformer having a secondary for energizing the coil and grid of the tube, a circuit connected across the primary of the transformer for providing a plate circuit with a definite voltage therein, battery means for superimposing on said voltage another definite voltage, and a measuring instrument in the plate circuit.

3. In an audion tube tester, a transformer having a secondary energizing the filament and the grid of the tube, a circuit connected across the primary of the transformer through the plate circuit, means to superimpose upon the alternating current in the plate circuit a direct current, and means to measure the currents.

4. In an audion tube tester, a transformer having a secondary forming the filament and the grid circuit, a circuit connected across the primary of the transformer through the plate of the tube, a battery circuit, means to cut the battery circuit into the plate circuit so that a direct current is superimposed upon the alternating current from the primary, and a measuring instrument for said currents.

5. In an audion tube tester, means to maintain a definite uniform filament and grid voltage, means to provide a definite alternating current to the plate, means to superimpose upon the alternating current a definite and predetermined direct current, and means to measure said currents.

6. In an audion tube tester, means to maintain a uniform filament and grid voltage, means to provide a definite alternating current to the plate, a battery for superimposing on the alternating current a definite direct current, and means to measure said currents.

7. In an audion tube tester, means to supply a definite grid voltage, means to apply an alternating current to the plate and the grid of the tube, means to superimpose upon the alternating current a definite direct current, and means to measure the currents.

8. The method of testing audion tubes which comprises energizing the grid and the filament circuits from an alternating current source, impressing upon the plate circuit an alternating voltage, superimposing upon the alternating voltage a continuous voltage, and indicating the magnitudes of the plate currents.

RAY L. TRIPLETT.